(12) United States Patent
Zong et al.

(10) Patent No.: US 10,901,550 B2
(45) Date of Patent: Jan. 26, 2021

(54) DISPLAY TOUCH SCANNING METHOD AND CHIP THEREOF, NON-VOLATILE STORAGE MEDIUM AND DISPLAY APPARATUS

(71) Applicants: BOE TECHNOLOGY GROUP CO., LTD., Beijing (CN); ORDOS YUANSHENG OPTOELECTRONICS CO., LTD., Inner Mongolia (CN)

(72) Inventors: Shaolei Zong, Beijing (CN); Jieqiong Wang, Beijing (CN); Jigang Sun, Beijing (CN)

(73) Assignees: BOE TECHNOLOGY GROUP CO., LTD., Beijing (CN); ORDOS YUANSHENG OPTOELECTRONICS CO., LTD., Inner Mongolia (CN)

( * ) Notice: Subject to any disclaimer, the term of this patent is extended or adjusted under 35 U.S.C. 154(b) by 258 days.

(21) Appl. No.: 16/123,654

(22) Filed: Sep. 6, 2018

(65) Prior Publication Data

US 2019/0294289 A1 Sep. 26, 2019

(30) Foreign Application Priority Data

Mar. 26, 2018 (CN) .......................... 2018 1 0253621

(51) Int. Cl.
*G06F 3/041* (2006.01)

(52) U.S. Cl.
CPC .......... *G06F 3/0416* (2013.01); *G06F 3/0412* (2013.01)

(58) Field of Classification Search
CPC .. G06F 3/0416; G06F 3/0412; G06F 3/04184; G06F 3/04166; G06F 3/0418; G06F 3/044
See application file for complete search history.

(56) References Cited

U.S. PATENT DOCUMENTS

| | | | |
|---|---|---|---|
| 10,474,286 B2 * | 11/2019 | Bae | G06F 3/03545 |
| 10,496,205 B2 * | 12/2019 | Jung | G06F 3/0412 |
| 10,635,210 B2 * | 4/2020 | Yi | G06F 3/044 |
| 10,656,751 B2 * | 5/2020 | Chan | G06F 3/0418 |
| 2009/0256818 A1 * | 10/2009 | Noguchi | G06F 1/3265 345/174 |
| 2010/0328239 A1 * | 12/2010 | Harada | G06F 3/0412 345/173 |
| 2010/0328256 A1 * | 12/2010 | Harada | G02F 1/13338 345/174 |
| 2011/0267295 A1 * | 11/2011 | Noguchi | G09G 3/3674 345/173 |

(Continued)

*Primary Examiner* — Carolyn R Edwards

(57) ABSTRACT

A display touch scanning method, a non-volatile storage medium, a display touch scanning chip and a display apparatus are disclosed. The display touch scanning method including: dividing one frame of display scan into M display time periods to be sequentially executed, and dividing one frame of touch scan into N touch time periods to be sequentially executed; and performing the touch scan using different touch loads in at least two adjacent touch time periods, or performing the display scan using different display loads in at least two adjacent display time periods. The M display time periods and the N touch time periods are interlaced, and M and N are integers greater than or equal to 2.

20 Claims, 6 Drawing Sheets

(56) References Cited

U.S. PATENT DOCUMENTS

| | | | | |
|---|---|---|---|---|
| 2012/0188201 A1* | 7/2012 | Binstead | ............. | G06F 3/046 345/174 |
| 2013/0082977 A1* | 4/2013 | Noguchi | ............. | G06F 3/044 345/174 |
| 2015/0091826 A1* | 4/2015 | Oh | ............. | G06F 3/0412 345/173 |
| 2016/0147348 A1* | 5/2016 | Liu | ............. | G06F 3/0416 345/173 |
| 2016/0370940 A1* | 12/2016 | Zhao | ............. | G06F 3/0416 |
| 2017/0090630 A1* | 3/2017 | Kim | ............. | G06F 3/0416 |

* cited by examiner (1) TL=4A  (2) TL=4A  (3) TL=4A  (4) TL=4A

TL=2A  TL=4A  TL=6A  TL=5A  TL=1A

TL=3A  TL=5A  TL=3A  TL=6A  TL=1A

DISPLAY TOUCH SCANNING METHOD AND CHIP THEREOF, NON-VOLATILE STORAGE MEDIUM AND DISPLAY APPARATUS

The present application claims the priority of Chinese patent application No. 201810253621.9 filed on Mar. 26, 2018, and the entire content disclosed by the Chinese patent application is incorporated herein by reference as part of the present application.

TECHNICAL FIELD

Embodiments of the present disclosure relate to a display touch scanning method, a non-volatile storage medium, a display touch scanning chip and a display apparatus.

BACKGROUND

At present, many electronic devices have both display and touch functions, and the display and touch functions are controlled by two chips independently. With a development of technology, the industry has begun to introduce a TDDI (Touch and Display Driver Integration) technology. The biggest feature of the TDDI technology is to integrate a touch chip and a display chip into a single chip to reduce cost and the like.

SUMMARY

At least one embodiment of the present disclosure provides a display touch scanning method, comprising: dividing one frame of display scan into M display time periods to be sequentially executed, and dividing one frame of touch scan into N touch time periods to be sequentially executed; and performing the touch scan using different touch loads in at least two adjacent touch time periods, or performing the display scan using different display loads in at least two adjacent display time periods. The M display time periods and the N touch time periods are interlaced, and M and N are integers greater than or equal to 2.

For example, in a display touch scanning method provided by an embodiment of the present disclosure, performing the touch scan using different touch loads in at least two adjacent touch time periods comprising: dividing a display touch panel into N touch scan regions; obtaining a touch scanning sequence of the N touch scan regions; and performing the one frame of touch scan on the display touch panel according to the touch scanning sequence. Scanning different one of the N touch scan regions in each of the N touch time periods, and at least two of the N touch scan regions are unequal in area, thereby enabling at least two of the N touch scan regions have different touch loads.

For example, in a display touch scanning method provided by an embodiment of the present disclosure, areas of any two of the N touch scan regions are different from each other.

For example, in a display touch scanning method provided by an embodiment of the present disclosure, dividing the display touch panel into the N touch scan regions comprising: selecting one of a plurality of preset dividing methods randomly; and dividing the display touch panel into the N touch scan regions according to the randomly selected dividing method.

For example, in a display touch scanning method provided by an embodiment of the present disclosure, dividing the display touch panel into the N touch scan regions comprising: dividing the display touch panel into the N touch scan regions by performing a random program.

For example, in a display touch scanning method provided by an embodiment of the present disclosure, dividing the display touch panel into the N touch scan regions comprising: dividing the display touch panel into the N touch scan regions according to rows or columns of the display touch panel.

For example, in a display touch scanning method provided by an embodiment of the present disclosure, obtaining the touch scanning sequence of the N touch scan regions comprising: obtaining the touch scanning sequence by performing a random program.

For example, a display touch scanning method provided by an embodiment of the present disclosure further comprising: performing at least one time of the one frame of touch scan repeatedly during the one frame of display scan.

For example, in a display touch scanning method provided by an embodiment of the present disclosure, a method of dividing the display touch panel into the N touch scan regions and/or the touch scanning sequence of the N touch scan regions is different each time when the one frame of touch scan is performed at different timings.

For example, in a display touch scanning method provided by an embodiment of the present disclosure, performing the display scan using different display loads in at least two adjacent display time periods comprising: dividing a display touch panel into M display scan regions; obtaining a display scanning sequence of the M display scan regions; and performing the one frame of display scan on the display touch panel according to the display scanning sequence. Scanning different one of the M display scan regions in each of the M display time periods, and at least two of the M display scan regions are unequal in area, thereby enabling at least two of the M display scan regions have different display loads.

For example, in a display touch scanning method provided by an embodiment of the present disclosure, areas of any two of the M display scan regions are different from each other.

For example, in a display touch scanning method provided by an embodiment of the present disclosure, dividing the display touch panel into the M display scan regions comprising: selecting one of a plurality of preset dividing methods randomly; and dividing the display touch panel into the M display scan regions according to the randomly selected dividing method.

For example, in a display touch scanning method provided by an embodiment of the present disclosure, dividing the display touch panel into the M display scan regions comprising: dividing the display touch panel into the M display scan regions by performing a random program.

For example, in a display touch scanning method provided by an embodiment of the present disclosure, obtaining the display scanning sequence of the M display scan regions comprising: selecting one of a plurality of preset display scanning sequences randomly.

For example, in a display touch scanning method provided by an embodiment of the present disclosure, obtaining the display scanning sequence of the M display scan regions comprising: obtaining the display scanning sequence by performing a random program.

At least one embodiment of the present disclosure further provides a non-volatile storage medium, the storage medium stores computer executable codes executable by a processor, and the computer executable codes are capable of being executed by the processor to implement the display touch scanning method provided by the embodiment of the present disclosure.

At least one embodiment of the present disclosure further provides a display touch scanning chip, comprising a processor and a non-volatile storage medium. The storage medium stores computer executable codes executable by the processor, and the computer executable codes are capable of being executed by the processor to implement the display touch scanning method provided by the embodiment of the present disclosure.

At least one embodiment of the present disclosure further provides a display apparatus, comprising a display touch panel and a display touch scanning chip provided by the embodiment of the present disclosure.

BRIEF DESCRIPTION OF DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Figure 1:
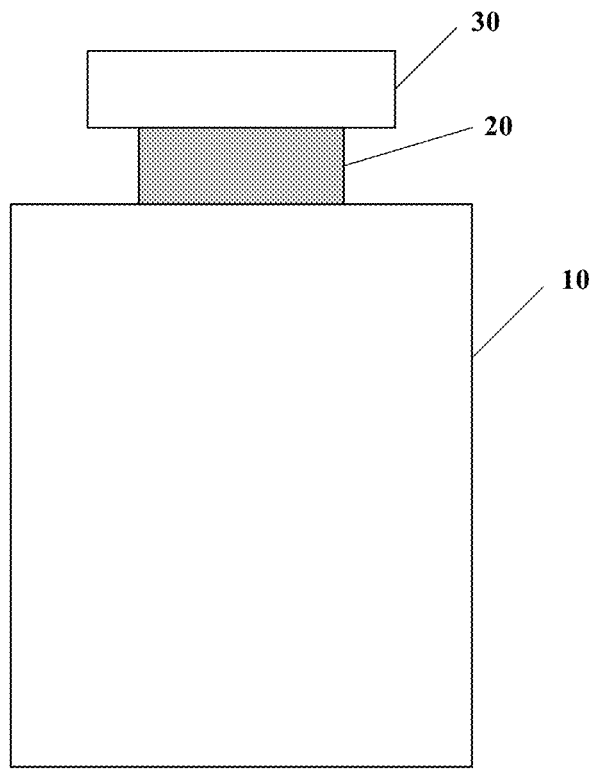
FIG. 1 is a schematic diagram showing a connection between a display touch panel and a display touch chip.
Figure 2:
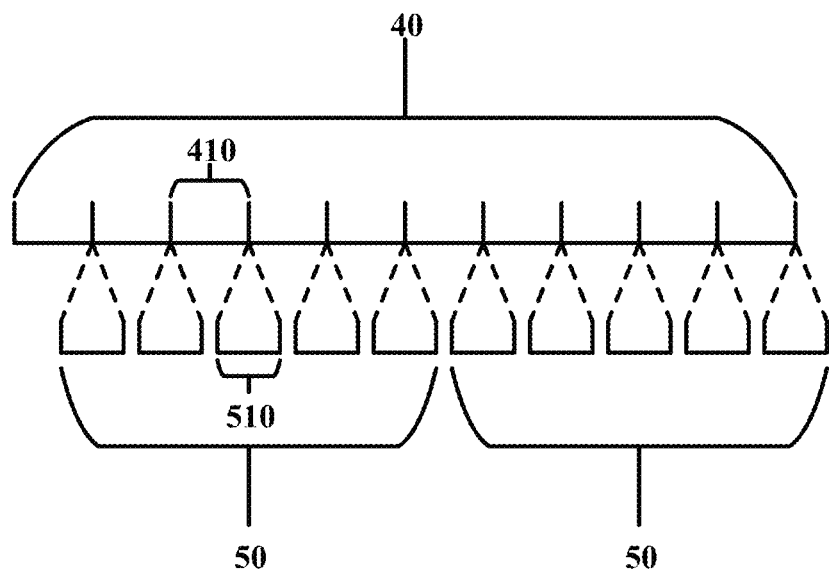
FIG. 2 is a schematic diagram showing that a display scan and a touch scan are interlaced according to an embodiment of the present disclosure.

For example, as shown in FIG. 1, a display touch panel 10 can be connected with a display touch scanning chip 30 through a flexible circuit board (FPC) 20. For example, the FPC can be bent so the display touch scanning chip 30 can be disposed on the back surface of the display touch panel 10, which is favorite to realize a narrow bezel touch display screen to meet consumer's demand for, for example, a full screen mobile terminal. For example, in the case of the display touch scanning chip 30 being provided with a charge pump circuit, a peripheral circuit of the charge pump circuit (for example, a circuit including capacitors and resistors) can be disposed on the FPC. A TDDI (Touch and Display Driver Integration) product usually adopts a LHB (Long Horizontal Blanking) scanning scheme, in which dividing one frame of display scan into multiple display time periods, dividing one frame of touch scan into multiple touch time periods, and the display time periods and the touch time periods are interlaced. For example, in the schematic diagram as shown in FIG. 2, one frame of display scan 40 is divided into 10 display time periods 410, one frame of touch scan 50 is divided into 5 touch time periods 510, and the touch time periods 510 and the display time periods 410 are interlaced; for example, as shown, between two adjacent display time periods 410 there is provided one touch time period 510, and the last touch time period 510 is provided after the last time period 410 (which is on the right side of the figure). For example, two frames of touch scan 50 can be performed in one frame of display scan 40, in this case, for example, the frequency of the display scan is 60 Hz, and the frequency of the touch scan is 120 Hz.

Figure 3:
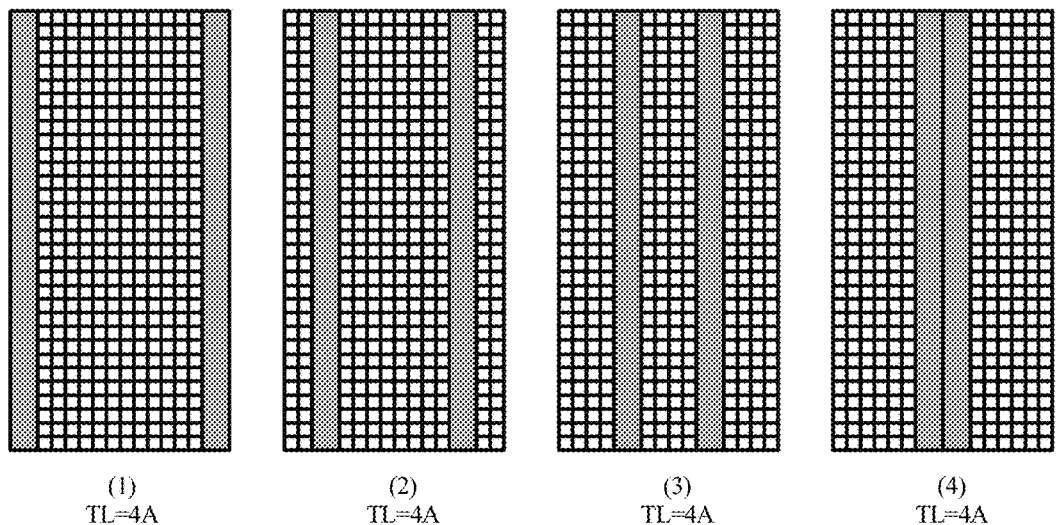
FIG. 3 is a schematic diagram showing a periodic change of a touch load in a display touch scanning method.

For example, as shown in FIG. 3, in a display touch scanning method, a 16*32 display touch panel is taken as an example for the purpose of description. The four images in FIG. 3 respectively represent touch loads (TL) of four touch time periods in one frame of touch scan, the gray portion in each image indicates a touch scan region loaded during the touch time period, and the number in the parenthesis below each image indicates the touch scanning sequence of the touch time period in the one frame of touch scan. TL≤4A indicates the touch load corresponding to the touch scan region which is loaded, for example, 4A indicates a load corresponding to four columns of touch units, and 2A indicates a load corresponding to two columns of touch units. Representing methods in the other figures in the embodiments of the present disclosure are similar to the above and will not be described again.

When the display scan and the touch scan are switched, because the display load (DL) and the touch load (TL) are different, the display touch scanning chip needs to provide different driving voltages. For example, in the display touch scanning method as shown in FIG. 3, the touch load is changed periodically, and in a case of the display load being also changed periodically, the driving voltage provided by the charge pump circuit in the display touch scanning chip is changed periodically. Capacitors in the charge pump circuit generate periodic electrostriction under the action of the resultant electric field, and drive the FPC to vibrate periodically. If the frequency of the vibration reaches a frequency band (20 Hz-20 kHz) that can be distinguished, that is, heard by human ears, the vibration will produce a FPC capacitor howling sound which is similar to "chirp . . . ". Especially for the users who use a consumer electronics product that includes the display touch panel, the user experience will be affected seriously.

At least one embodiment of the present disclosure provides a display touch scanning method. The display touch scanning method including: dividing one frame of display scan into M display time periods to be sequentially executed, and dividing one frame of touch scan into N touch time periods to be sequentially executed; and performing the touch scan using different touch loads in at least two adjacent touch time periods, or performing the display scan using different display loads in at least two adjacent display time periods. The M display time periods and the N touch time periods are interlaced, and M and N are integers greater than or equal to 2. At least one embodiment of the present disclosure further provides a non-volatile storage medium, a display touch scanning chip and a display apparatus corresponding to the above-described display touch scanning method.

The display touch scanning method, the non-volatile storage medium, the display touch scanning chip and the display apparatus provided in the embodiments of the present disclosure can prevent the touch load and the display load from changing periodically at the same time when the touch scan and the display scan are performed, thereby the FPC capacitor howling on the display apparatus can be avoided.

The embodiments of the present disclosure will be described in detail below with reference to the accompanying drawings.

At least one embodiment of the present disclosure provides a display touch scanning method, and the display touch scanning method including the following operations.

Step S10: dividing one frame of display scan into M display time periods to be sequentially executed, and dividing one frame of touch scan into N touch time periods to be sequentially executed;

Step S20: performing the touch scan using different touch loads in at least two adjacent touch time periods; or Step S30: performing the display scan using different display loads in at least two adjacent display time periods.

For example, the M display time periods and the N touch time periods are interlaced, and M and N are integers greater than or equal to 2. For example, the M display time periods and the N touch time periods are periodically (or regularly) interlaced.

For example, as shown in FIG. 2, in one example of the present disclosure, one frame of display scan 40 can be divided into 10 display time periods 410 to be sequentially executed in the step S10, and a scanning operation of all display scan regions of a display touch panel is completed in the one frame of display scan 40. One frame of touch scan 50 can be divided into 5 touch time periods 510 to be sequentially executed in the step S10, and a scanning operation of all touch scan regions of the display touch panel is completed in the one frame of touch scan 50. For example, the display scan regions and the touch scan regions of the display touch panel are same.

It should be noted that, in the example as shown in FIG. 2, M=10, N=5, and M is an integer multiple of N. Except the last touch time period (on the right side of the figure), the touch time period 510 is inserted between every two adjacent display time periods 410; accordingly, except the first display time period (on the left side of the figure), the display time period 410 is inserted between every two adjacent touch time periods 510. The embodiments of the present disclosure include, but are not limited to, the illustrated example. For example, M cannot be an integer multiple of N, and for example, the touch time period 510 can be inserted only between portions of the adjacent display time periods 410.

In the example as shown in FIG. 2, the 10 display time periods 410 and the 10 touch time periods 510 are distributed alternately, that is, one frame of display scan 40 corresponds to two frames of touch scan 50 in time, so it is allowed that the frequency of the touch scan is twice the frequency of the display scan. The above distribution also enables one touch time period 510 to be inserted between every two adjacent display time periods 410, and enables one display time period 410 to be inserted between every two adjacent touch time periods 510. In the example as shown in FIG. 2, the last touch time period 510 of the one frame of touch scan can be considered to be located between the last display time period 410 in the current frame of display scan and the first display time period 410 in the next frame of display scan. Correspondingly, the first display time period 410 of one frame of display scan can be considered to be located between the first touch time period 510 in the current frame of touch scan and the last touch time period 510 in the previous frame of touch scan. For example, if the frequency of the display scan is 60 Hz, the frequency of the touch scan is 120 Hz. The embodiments of the present disclosure include, but are not limited to, the illustrated example. For example, it is also possible to insert 5 touch time periods 510 in 10 display time periods 410, so the frequency of the touch scan and the frequency of the display scan are same. For another example, more frames of touch scan 50 can be inserted into one frame of display scan 40 to improve the frequency of the touch scan, thereby improving the sensitivity of the display touch panel when performing a touch operation.

For example, after the step S10 is executed, the step S20 can be executed, that is, performing the touch scan using different touch loads in at least two adjacent touch time periods 510, thereby can prevent the touch load from changing periodically during the touch scan. Or after the step S10 is executed, the step S30 can be executed, that is, performing the display scan using different display loads in at least two adjacent display time periods 410, thereby can prevent the display load from changing periodically during the display scan.

In the display touch scanning method provided by the embodiment of the present disclosure, when the touch scan and the display scan are performed, the touch load and the display load can be prevented from changing periodically at the same time by changing the touch load or the display load, thereby the FPC capacitor howling on the display apparatus can be avoided.

It should be noted that, ill the following embodiments, an 18*32 display touch panel is taken as an example for the purpose of description. The embodiments of the present disclosure do not limit the size of the display touch panel.

In the display touch scanning method provided by an embodiment of the present disclosure, the step S20 can include the following operations.

Step S210: dividing the display touch panel into N touch scan regions;

Step S220: obtaining a touch scanning sequence of the N touch scan regions; and

Step S230: performing the one frame of touch scan on the display touch panel according to the touch scanning sequence.

For example, scanning different one of the N touch scan regions in each of the N touch time periods, and at least two of the N touch scan regions are unequal in area, thereby enabling at least two of the N touch scan regions have different touch loads. N is an integer greater than or equal to 2.

Figure 4:
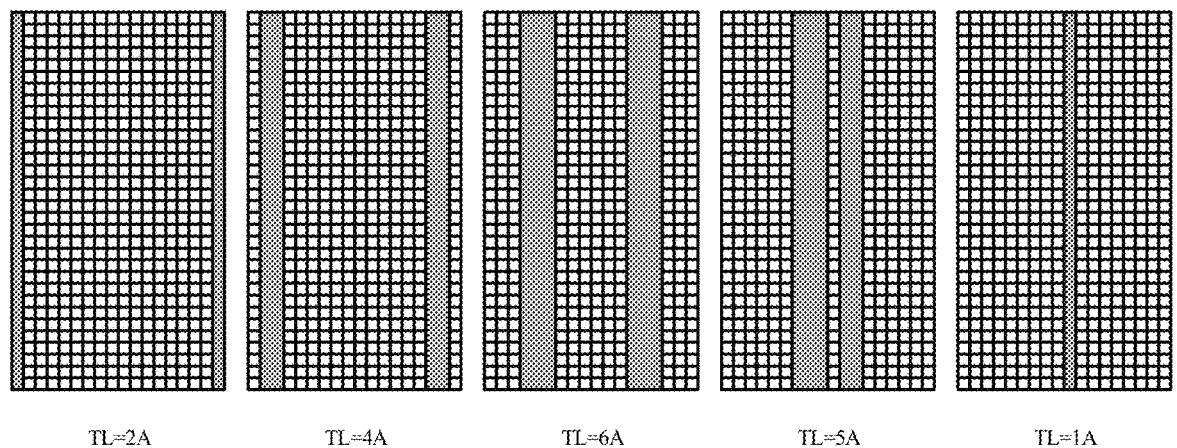
FIG. 4 is a schematic diagram of a dividing method of touch scan regions according to an embodiment of the present disclosure.

For example, in an embodiment of the present disclosure, in the step S210, areas of any two of the N touch scan regions are different from each other. For example, in the example as shown in FIG. 4, the display touch panel can be divided into 5 touch scan regions according to columns, and touch loads (TL) corresponding to the 5 touch scan regions are 2A, 4A, 6A, 5A and 1A respectively. It should be noted that, as mentioned above, 1A indicates a load corresponding to one column of touch units, and the others are similar to this and will not be described again.

In the embodiments of the present disclosure, when dividing the display touch panel, areas of any two of the N touch scan regions are different from each other. In this manner, the periodicity of the touch load can be further disrupted, thereby the FPC capacitor howling on the display apparatus which adopts the display touch panel can be further avoided.

It should be noted that, the embodiments of the present disclosure do not limit the dividing method of the display touch panel, as long as areas of at least two touch scan regions are not equal, that is, the touch loads of the at least two touch scan regions are different.

Figure 5:
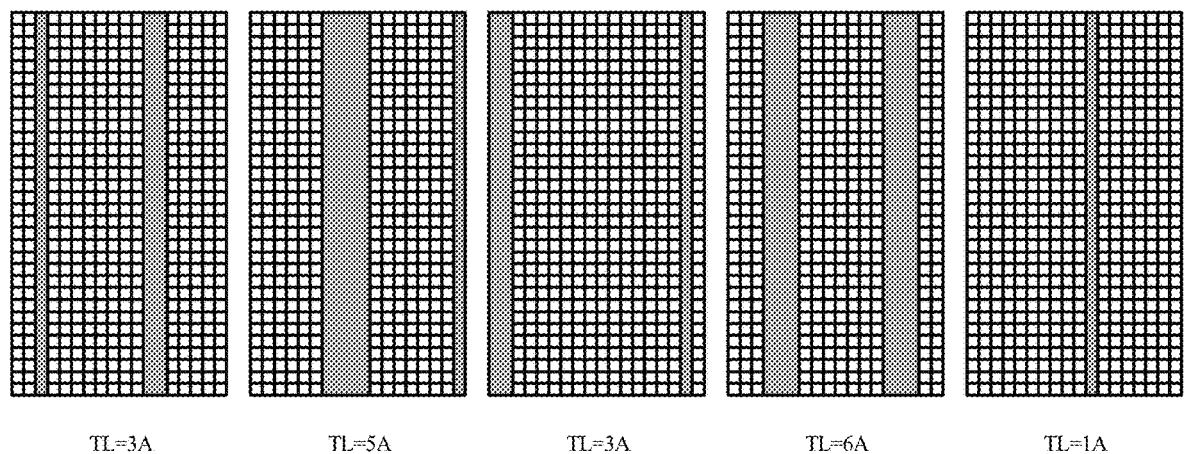
FIG. 5 is a schematic diagram of another dividing method of touch scan regions according to an embodiment of the present disclosure.

For example, in another example as shown in FIG. 5, the touch loads (TL) corresponding to the 5 touch scan regions are 3A, 5A, 3A, 6A, and 1A, respectively.

In the examples as shown in FIG. 4 and FIG. 5, the display touch panel is both divided into 5 touch scan regions. The embodiments of the present disclosure do not limit the number of the divided touch scan regions, for example, the display touch panel can be further divided into two, three, four or more touch scan regions.

Figure 6:
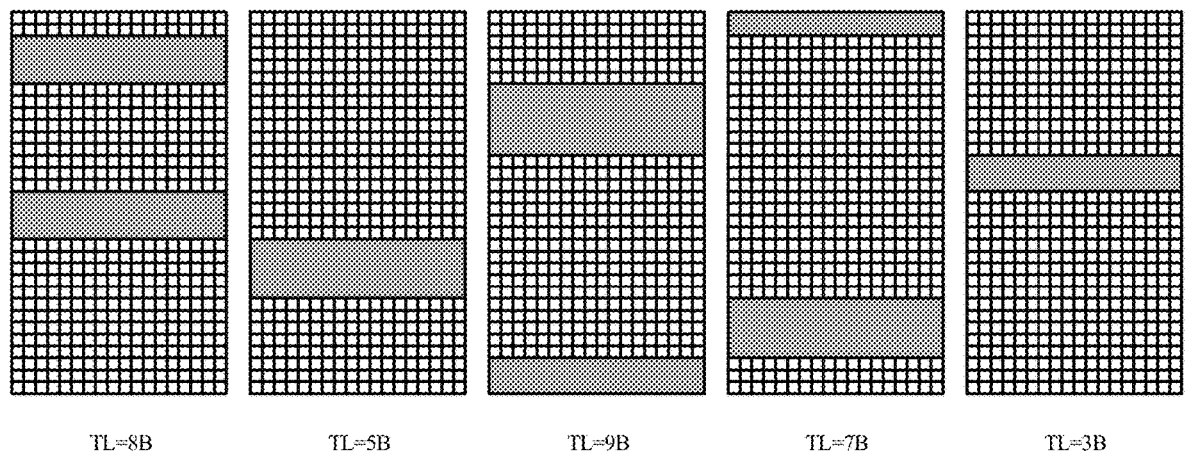
FIG. 6 is a schematic diagram of another dividing method of touch scan regions according to an embodiment of the present disclosure.

For example, in another example as shown in FIG. 6, the display touch panel can be further divided into 5 touch scan regions according to rows, and the touch loads corresponding to the 5 touch scan regions are 8B, 5B, 9B, 7B and 3B, respectively. 1B indicates a load corresponding to one row of touch units, and the others are similar to this and will not be described again. It should be noted that, the row and the column of a display touch panel are relative, one direction is defined as row, and the other direction perpendicular to the direction is defined as column naturally. For the dividing method according to the row, reference can be made to the dividing method according to the column, and details are not described here again.

For example, in the display touch scanning method provided by an embodiment of the present disclosure, the step S210 can include the following operations.

Step S211: selecting one of a plurality of preset dividing methods randomly; and Step S212: dividing the display touch panel into the N touch scan regions according to the randomly selected dividing method.

For example, the plurality of dividing methods can be stored in a non-volatile storage medium in advance. When performing the step S211, a display touch scanning chip or a processor can read the dividing methods from the non-volatile storage medium directly, then select one dividing method randomly, and then the Step S212 is performed to complete the division of the touch scan regions. Because one of the plurality of dividing methods can be selected randomly each time when the one frame of touch scan is performed at different timings, the touch load can be further prevented from changing periodically, thereby the FPC capacitor howling on the display apparatus can be further avoided. Further, because the plurality of dividing methods are stored in the non-volatile storage medium in advance, they can be called directly when needed, thereby shortening the execution time of the display touch scanning method.

For example, in the display touch scanning method provided by an embodiment of the present disclosure, the step S210 can include the following operation.

Step S213: dividing the display touch panel into the N touch scan regions by performing a random program.

For example, the random program can be stored in a non-volatile storage medium in advance. When performing the step S213, a display touch scanning chip or a processor can call the random program from the non-volatile storage medium and execute, thereby dividing the display touch panel into N touch scan regions. For example, a parameter can be set in the random program, and the parameter corresponds to the number of the divided touch scan regions. When it is necessary to modify the number of the divided touch scan regions, the parameter can be modified directly.

Figure 7:
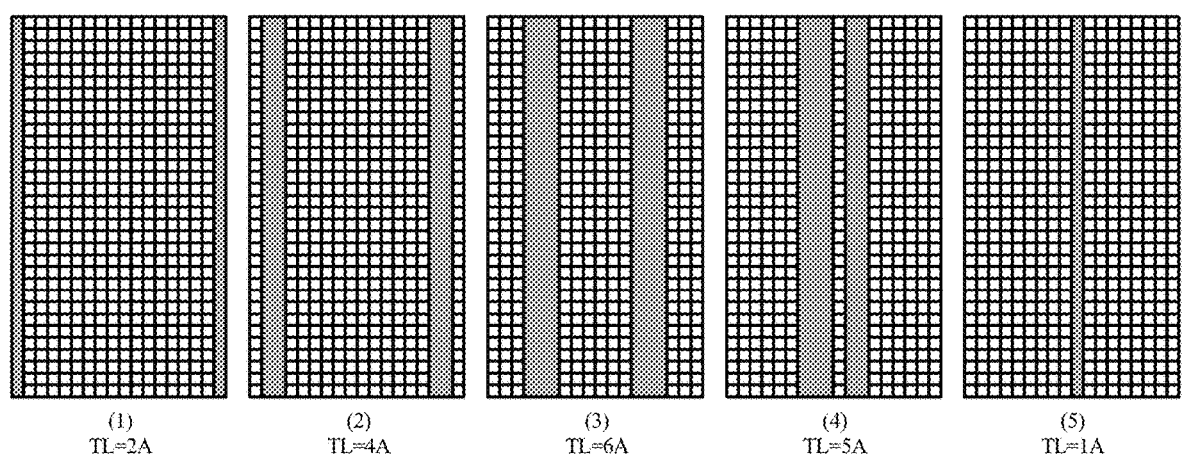
FIG. 7 is a schematic diagram of a touch scanning sequence corresponding to the dividing method of touch scan regions in FIG. 4.
Figure 8:
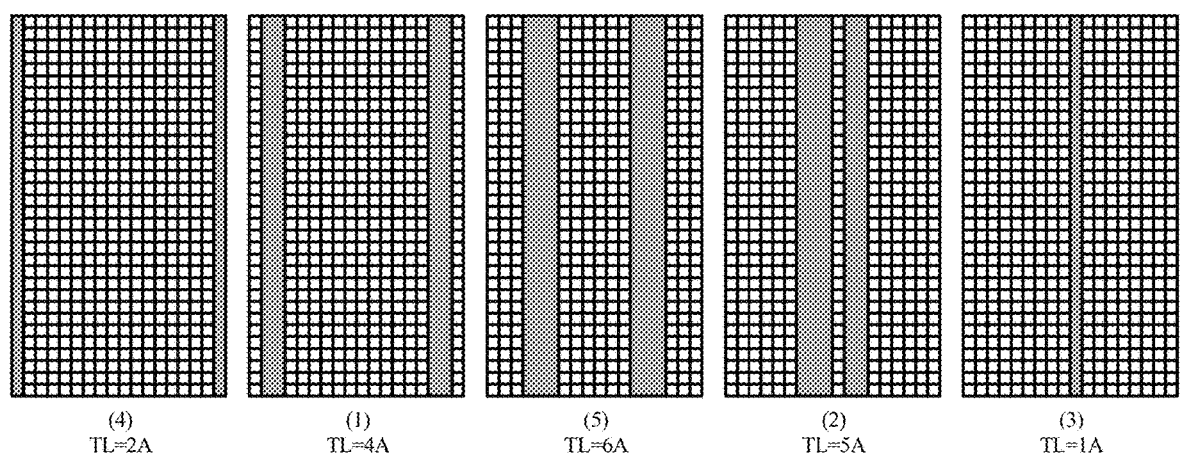
FIG. 8 is a schematic diagram of another touch scanning sequence corresponding to the dividing method of touch scan regions in FIG. 4.

For example, for the N touch scan regions that are divided in the step S210, the step S220 can be performed to obtain the touch scanning sequence of the N touch scan regions. For example, in the example as shown in FIG. 4, the display touch panel is divided into 5 touch scan regions. For the 5 touch scan regions, there are $A_5^2=120$ touch scanning sequences. For example, FIG. 7 and FIG. 8 show two touch scanning sequences, respectively. It should be noted that, the number in the parenthesis below each image indicates the touch scanning sequence of the touch time period in the one frame of touch scan.

For example, in the display touch scanning method provided by an embodiment of the present disclosure, the step S220 can include the following operation.

Step S221: selecting one of a plurality of preset touch scanning sequences randomly.

For example, the plurality of touch scanning sequences can be stored in a non-volatile storage medium in advance. When performing the step S221, a display touch scanning chip or a processor can read the touch scanning sequences from the non-volatile storage medium directly, then select one touch scanning sequence randomly. Because one of the plurality of touch scanning sequences can be selected randomly each time when the one frame of touch scan is performed at different timings, the touch load can be further prevented from changing periodically, thereby the FPC capacitor howling on the display apparatus can be further avoided. Further, because the plurality of touch scanning sequences are stored in the non-volatile storage medium in advance, they can be called directly when needed, thereby shortening the execution time of the display touch scanning method.

For example, in the display touch scanning method provided by an embodiment of the present disclosure, the step S220 can include the following operation.

Step S222: obtaining the touch scanning sequence by performing a random program.

For example, the random program can be stored in a non-volatile storage medium in advance. When performing the step S222, a display touch scanning chip or a processor can call the random program from the non-volatile storage medium and execute, thereby obtaining the touch scanning sequence.

For example, after dividing the display touch panel into the N touch scan regions in step S210 and obtaining the touch scanning sequence of the N touch scan regions in step S220, the step S230 can be performed, that is, performing the one frame of touch scan on the N touch scan regions according to the touch scanning sequence.

In the display touch scanning method provided by the embodiment of the present disclosure, after dividing the display touch panel into the N touch scan regions, the touch scanning sequence of the N touch scan regions is randomized to further prevent the touch load from changing periodically, thereby the FPC capacitor howling on the display apparatus can be further avoided.

For example, in the display touch scanning method provided by the embodiment of the present disclosure, the following operation can also be included.

Step S40: performing at least one time of the one frame of touch scan repeatedly during the one frame of display scan.

For example, in the example as shown in FIG. 2, the one frame of touch scan 50 can be repeatedly performed twice in the one frame of display scan 40. In this case, the frequency of the touch scan is twice the frequency of the display scan. The embodiments of the present disclosure include, but are not limited to, the example. For example, 3 frames, 4 frames or more frames of the touch scan 50 can be repeatedly performed in the one frame of the display scan 40 to improve the frequency of the touch scan, thereby improving the sensitivity of the display touch panel when performing a touch operation.

For example, in the step S40, the dividing method of the N touch scan regions and/or the touch scanning sequence of the N touch scan regions is different each time when a different frame of touch scan is performed at different timings. For example, when performing multi-frames of touch scan, enabling the dividing method of the N touch scan regions to be kept unchanged, and enabling the touch scanning sequence to be changed. For another example, when performing multi-frames of touch scan, enabling the dividing method and the touch scanning sequence of the N touch scan regions to be both changed.

In the display touch scanning method provided by an embodiment of the present disclosure, the step S30 can include the following operations.

Step S310: dividing the display touch panel into M display scan regions;

Step S320: obtaining a display scanning sequence of the M display scan regions; and Step S330: performing the one frame of display scan on the display touch panel according to the display scanning sequence.

For example, scanning different one of the M display scan regions in each of the M display time periods, and at least two of the M display scan regions are unequal in area, thereby enabling at least two of the M display scan regions have different display loads. M is an integer greater than or equal to 2.

Figure 9:
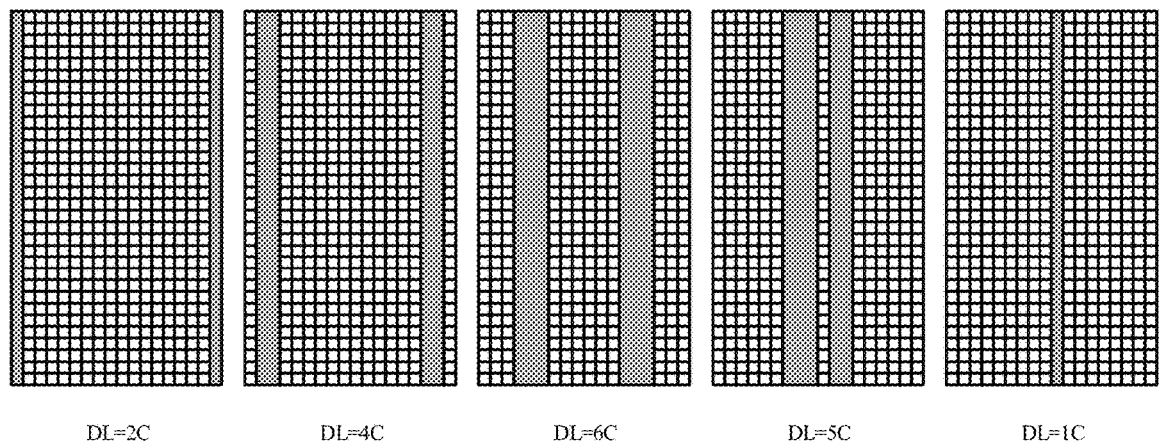
FIG. 9 is a schematic diagram of a dividing method of display scan regions according to an embodiment of the present disclosure.

For example, in an embodiment of the present disclosure, in the step S310, areas of any two of the M display scan regions are different from each other. For example, in an example as shown in FIG. 9, the display touch panel can be divided into 5 display scan regions according to columns, and display loads (DL) corresponding to the 5 display scan regions are 2C, 4C, 6C, 5C and 1C respectively. It should be noted that, as mentioned above, 1C indicates a load corresponding to one column of display units, and the others are similar to this and will not be described again.

In the embodiment of the present disclosure, when dividing the display touch panel, areas of any two of the M display scan regions are different from each other. In this manner, the periodicity of the display load can be further disrupted, thereby the FPC capacitor howling on the display apparatus which adopts the display touch panel can be further avoided.

It should be noted that, the embodiments of the present disclosure do not limit the dividing method of the display touch panel, as long as areas of at least two display scan regions are not equal, that is, the display loads of the at least two display scan regions are different.

Figure 10:
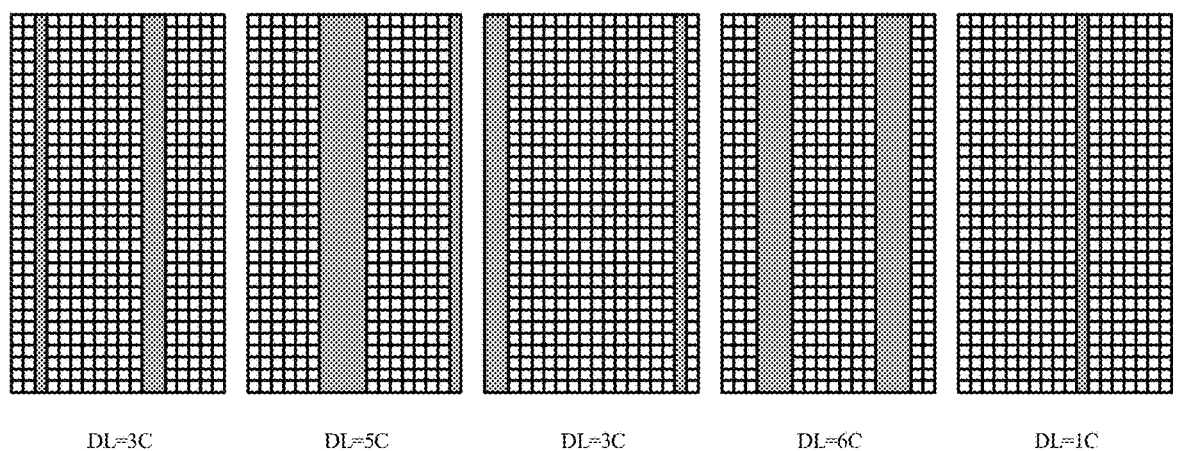
FIG. 10 is a schematic diagram of another dividing method of display scan regions according to an embodiment of the present disclosure.

For example, in another example as shown in FIG. 10, the display loads (DL) corresponding to the 5 display scan regions are 3C, 5C, 3C, 6C, and 1C, respectively.

In the examples as shown in FIG. 9 and FIG. 10, the display touch panel is both divided into 5 display scan regions. The embodiments of the present disclosure do not limit the number of the divided display scan regions, for example, the display touch panel can be further divided into two, three, four or more display scan regions.

Figure 11:
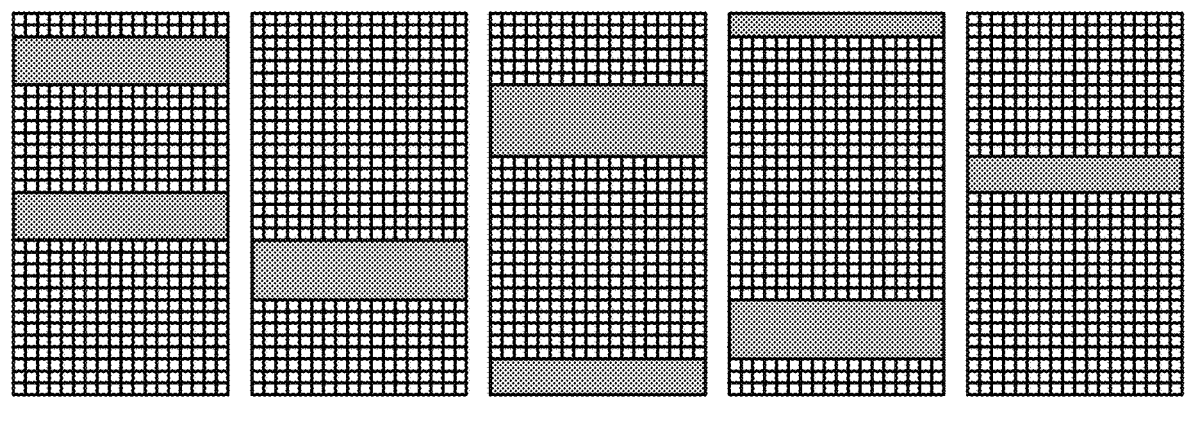
FIG. 11 is a schematic diagram of another dividing method of display scan regions according to an embodiment of the present disclosure.

For example, in another example as shown in FIG. 11, the display touch panel can be further divided into 5 display scan regions according to rows, and the display loads corresponding to the 5 display scan regions are 8D, 5D, 9D, 7D and 3D, respectively. 1D indicates a load corresponding to one row of display units, and the others are similar to this and will not be described again.

For example, in the display touch scanning method provided by an embodiment of the present disclosure, the step S310 can include the following operations.

Step S311: selecting one of a plurality of preset dividing methods randomly; and Step S312: dividing the display touch panel into the M display scan regions according to the randomly selected dividing method.

For example, the plurality of dividing methods can be stored in a non-volatile storage medium in advance. When performing the step S311, a display touch scanning chip or a processor can read the dividing methods from the non-volatile storage medium directly, then select one dividing method randomly, and then the Step S312 is performed to complete the division of the display scan regions. Because one of the plurality of dividing methods can be selected randomly each time when the one frame of display scan is performed at different timings, the display load can be further prevented from changing periodically, thereby the FPC capacitor howling on the display apparatus can be further avoided. Further, because the plurality of dividing methods are stored in the non-volatile storage medium in advance, they can be called directly when needed, thereby shortening the execution time of the display touch scanning method.

For example, in the display touch scanning method provided by an embodiment of the present disclosure, the step S310 can include the following operation.

Step S313: dividing the display touch panel into the M display scan regions by performing a random program.

For example, the random program can be stored in a non-volatile storage medium in advance. When performing the step S313, a display touch scanning chip or a processor can call the random program from the non-volatile storage medium and execute, thereby dividing the display touch panel into M display scan regions. For example, a parameter can be set in the random program, and the parameter corresponds to the number of the divided display scan regions. When it is necessary to modify the number of the divided display scan regions, the parameter can be modified directly.

Figure 12:
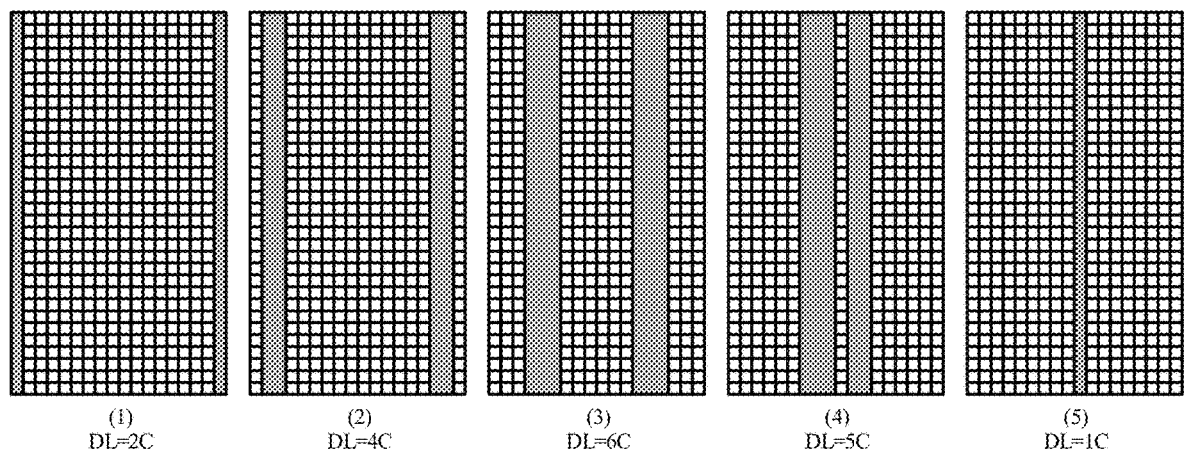
FIG. 12 is a schematic diagram of a display scanning sequence corresponding to the dividing method of display scan regions in FIG. 9.
Figure 13:
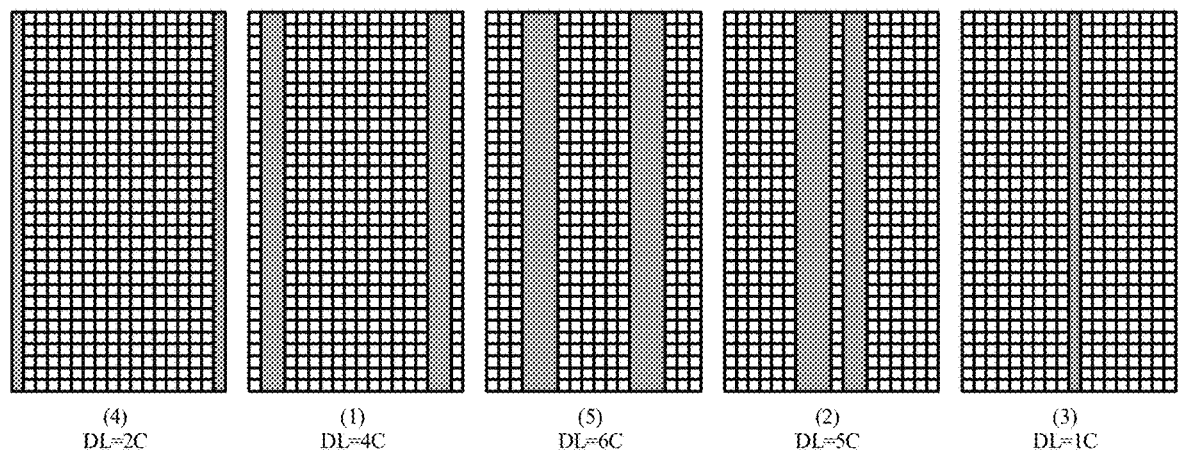
FIG. 13 is a schematic diagram of another display scanning sequence corresponding to the dividing method of display scan regions in FIG. 9.

For example, for the M display scan regions that are divided in the step S310, the step S320 can be performed to obtain the display scanning sequence of the M display scan regions. For example, in the example as shown in FIG. 9, the display touch panel is divided into 5 display scan regions. For the 5 display scan regions, there are $A_5^2=120$ display scanning sequences. For example, FIG. 12 and FIG. 13 show two display scanning sequences, respectively. It should be noted that, the number in the parenthesis below each image indicates the display scanning sequence of the display time period in the one frame of display scan.

For example, in the display touch scanning method provided by an embodiment of the present disclosure, the step S320 can include the following operation.

Step S321: selecting one of a plurality of preset display scanning sequences randomly.

For example, the plurality of display scanning sequences can be stored in a non-volatile storage medium in advance. When performing the step S321, a display touch scanning chip or a processor can read the display scanning sequences from the non-volatile storage medium directly, then select one display scanning sequence randomly. Because one of the plurality of display scanning sequences can be selected randomly each time when the one frame of display scan is performed at different timings, the display load can be further prevented from changing periodically, thereby the FPC capacitor howling on the display apparatus can be further avoided. Further, because the plurality of display scanning sequences are stored in the non-volatile storage medium in advance, they can be called directly when needed, thereby shortening the execution time of the display touch scanning method.

For example, in the display touch scanning method provided by an embodiment of the present disclosure, the step S320 can include the following operation.

Step S322: obtaining the display scanning sequence by performing a random program.

For example, the random program can be stored in a non-volatile storage medium in advance. When performing the step S322, a display touch scanning chip or a processor can call the random program from the non-volatile storage medium and execute, thereby obtaining the display scanning sequence.

For example, after dividing the display touch panel into the M display scan regions in step S310 and obtaining the display scanning sequence of the M display scan regions in step S320, the step S330 can be performed, that is, performing the one frame of display scan on the M display scan regions according to the display scanning sequence.

In the display touch scanning method provided by the embodiment of the present disclosure, after dividing the display touch panel into the M display scan regions, the display scanning sequence of the M display scan regions is randomized to further prevent the display load from changing periodically, thereby the FPC capacitor howling on the display apparatus can be further avoided.

Figure 14:
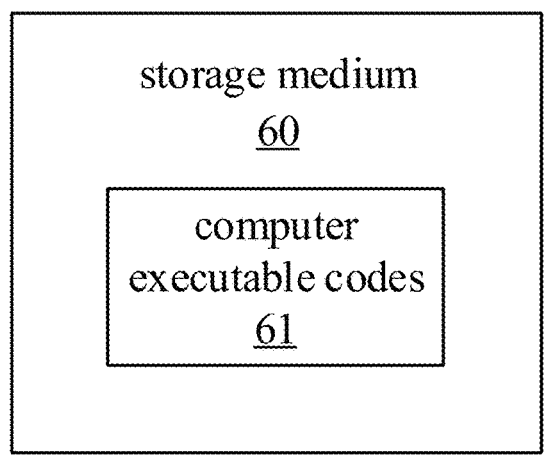
FIG. 14 is a schematic diagram of a non-volatile storage medium according to an embodiment of the present disclosure.

An embodiment of the present disclosure further provides a non-volatile storage medium 60, as shown in FIG. 14, the non-volatile storage medium 60 stores computer executable codes 61 executable by a processor, and the computer executable codes 61 are capable of being executed by the processor to implement the operations in the display touch scanning method provided by the embodiment of the present disclosure.

For example, in an example, the non-volatile storage medium 60 can be disposed in a computing device. The computing device can further include a processor, and the processor can call the computer executable codes 61 stored in the non-volatile storage medium 60.

Figure 15:
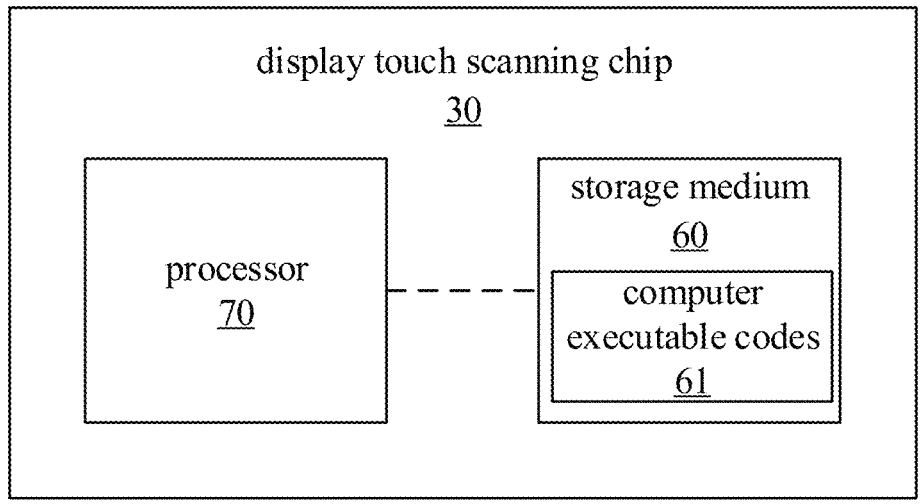
FIG. 15 is a schematic diagram of a display touch scanning chip according to an embodiment of the present disclosure.

An embodiment of the present disclosure further provides a display touch scanning chip 30, as shown in FIG. 15, the display touch scanning chip 30 includes a processor 70 and a non-volatile storage medium 60. The storage medium 60 is configured to store and has stored computer executable codes 61 executable by the processor 70, and the computer executable codes 61 are capable of being executed by the processor 70 to implement the operations in the display touch scanning method provided by the embodiment of the present disclosure.

The display touch scanning chip 30 provided in the embodiment of the present disclosure can be disposed on a display touch panel for controlling the display touch panel to perform a display scan and a touch scan. When the display touch scanning chip 30 is driving the display touch panel to perform the display scan and the touch scan, the touch load and the display load can be prevented from changing periodically at the same time by changing the touch load or the display load, thereby the FPC capacitor howling on the display apparatus which adopts the display touch panel can be avoided.

Figure 16:
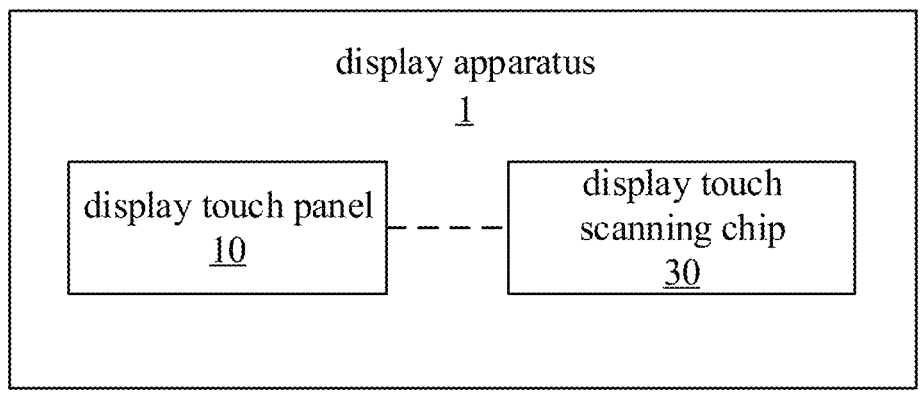
FIG. 16 is a schematic diagram of a display apparatus according to an embodiment of the present disclosure.

An embodiment of the present disclosure further provides a display apparatus 1, as shown in FIG. 16, the display apparatus 1 includes a display touch panel 10 and the display touch scanning chip 30 provided in the embodiment of the present disclosure. The display touch panel 10 includes a display array and a touch array. The display touch scanning chip 30 is electrically connected with the display touch panel 10 to drive the display array and the touch array.

The display apparatus 1 provided by the embodiment of the present disclosure can prevent the touch load and the display load from changing periodically at the same time by changing the touch load or the display load, thereby the FPC capacitor howling on the display apparatus 1 can be avoided.

For example, the display apparatus 1 provided by the embodiment of the present disclosure can be an electronic paper, a mobile phone, a tablet computer, a television, a display, a notebook computer, a digital photo frame, a navigator and other products or members having display function.

In the embodiment of the present disclosure, the processor can be implemented by any circuit having information processing capability. For example, the processor is implemented by a universal integrated circuit chip or an application-specific integrated circuit chip. For example, the integrated circuit chip can be disposed on a motherboard, for example, a storage medium and a power supply circuit can be disposed on the motherboard. In addition, the processor can also be implemented by a circuit or software, hardware (circuit), firmware or any combination thereof, for example, the processor is implemented by a field-programmable gate array (FPGA). In the embodiments of the present disclosure, the processor can include a variety of computational structures, e.g., a complex instruction set computer (CISC) structure, a reduced instruction set computing (RISC) structure or a structure that incorporates a plurality of instruction set combinations. In some embodiments, the processor can also be a CPU, a microprocessor, e.g., an X86 processor or an ARM processor, and can also be a GPU or a DSP, etc.

In the embodiment of the present disclosure, the storage medium can be disposed, for example, on the above-mentioned motherboard, the storage medium can save instructions and/or data executed by the processor, and save data generated by running instructions, etc., and the generated data can be structured data or unstructured data, etc. For example, the storage medium can include one or more computer program products. The computer program products can include various kinds of computer readable storage media, e.g., non-volatile memory. Non-volatile memory, for example, includes read-only memory (ROM), magnetic disk, optical disk, semiconductor memory (for example, flash memory, resistive memory, etc.) etc. One or more computer program instructions can be stored in the computer readable storage medium. The processor can execute the program instructions to realize the desired functions (implemented by the processor) in the embodiments of the present disclosure.

What have been described above are only specific implementations of the present disclosure, the protection scope of the present disclosure is not limited thereto. The protection scope of the present disclosure should be based on the protection scope of the claims.

What is claimed is:

1. A display touch scanning method, comprising:
dividing one frame of display scan into M display time periods to be sequentially executed, and dividing one frame of touch scan into N touch time periods to be sequentially executed; and
performing the touch scan using different touch loads in at least two adjacent touch time periods, or performing the display scan using different display loads in at least two adjacent display time periods;
wherein the M display time periods and the N touch time periods are interlaced,
and M and N are integers greater than or equal to 2;
wherein performing the touch scan using different touch loads in at least two adjacent touch time periods comprising:
dividing a display touch panel into N touch scan regions;
obtaining a touch scanning sequence of the N touch scan regions; and
performing the one frame of touch scan on the display touch panel according to the touch scanning sequence;
wherein scanning different one of the N touch scan regions in each of the N touch time periods, and at least two of the N touch scan regions are unequal in area, thereby enabling at least two of the N touch scan regions have different touch loads;
wherein dividing the display touch panel into the N touch scan regions comprising:
selecting one of a plurality of preset dividing methods randomly; and
dividing the display touch panel into the N touch scan regions according to the randomly selected dividing method.

2. The display touch scanning method according to claim 1, wherein the display touch panel is divided into the N touch scan regions according to rows or columns of the display touch panel.

3. The display touch scanning method according to claim 1, wherein obtaining the touch scanning sequence of the N touch scan regions comprising:
selecting one of a plurality of preset touch scanning sequences randomly.

4. The display touch scanning method according to claim 1, wherein obtaining the touch scanning sequence of the N touch scan regions comprising:
obtaining the touch scanning sequence by performing a random program.

5. The display touch scanning method according to claim 1, further comprising:
performing at least one time of the one frame of touch scan repeatedly during the one frame of display scan.

6. The display touch scanning method according to claim 5, wherein a method of dividing the display touch panel into the N touch scan regions and/or the touch scanning sequence of the N touch scan regions is different each time when the one frame of touch scan is performed at different timings.

7. The display touch scanning method according to claim 1, wherein performing the display scan using different display loads in at least two adjacent display time periods comprising:
dividing a display touch panel into M display scan regions;
obtaining a display scanning sequence of the M display scan regions; and
performing the one frame of display scan on the display touch panel according to the display scanning sequence;
wherein scanning different one of the M display scan regions in each of the M display time periods, and at least two of the M display scan regions are unequal in area, thereby enabling at least two of the M display scan regions have different display loads.

8. The display touch scanning method according to claim 7, wherein areas of any two of the M display scan regions are different from each other.

9. The display touch scanning method according to claim 7, wherein dividing the display touch panel into the M display scan regions comprising:

selecting one of a plurality of preset dividing methods randomly; and dividing the display touch panel into the M display scan regions according to the randomly selected dividing method.

10. The display touch scanning method according to claim 7, wherein dividing the display touch panel into the M display scan regions comprising:

dividing the display touch panel into the M display scan regions by performing a random program.

11. The display touch scanning method according to claim 7, wherein obtaining the display scanning sequence of the M display scan regions comprising:

selecting one of a plurality of preset display scanning sequences randomly.

12. The display touch scanning method according to claim 7, wherein obtaining the display scanning sequence of the M display scan regions comprising:

obtaining the display scanning sequence by performing a random program.

13. The display touch scanning method according to claim 7, further comprising:

performing at least one time of the one frame of touch scan repeatedly during the one frame of display scan.

14. A non-transitory storage medium, wherein the storage medium stores computer executable codes executable by a processor, and the computer executable codes are capable of being executed by the processor to implement the display touch scanning method according to claim 1.

15. A display touch scanning chip, comprising a processor and a non-transitory storage medium, wherein the storage medium stores computer executable codes executable by the processor, and the computer executable codes are capable of being executed by the processor to implement the display touch scanning method according to claim 1.

16. A display apparatus, comprising a display touch panel and a display touch scanning chip according to claim 15.

17. The display touch scanning method according to claim 1, wherein areas of any two of the N touch scan regions are different from each other.

18. A display touch scanning method, comprising:

dividing one frame of display scan into M display time periods to be sequentially executed, and dividing one frame of touch scan into N touch time periods to be sequentially executed; and performing the touch scan using different touch loads in at least two adjacent touch time periods, or performing the display scan using different display loads in at least two adjacent display time periods;

wherein the M display time periods and the N touch time periods are interlaced, and M and N are integers greater than or equal to 2, wherein performing the touch scan using different touch loads in at least two adjacent touch time periods comprising:

dividing a display touch panel into N touch scan regions;

obtaining a touch scanning sequence of the N touch scan regions; and performing the one frame of touch scan on the display touch panel according to the touch scanning sequence;

wherein scanning different one of the N touch scan regions in each of the N touch time periods, and at least two of the N touch scan regions are unequal in area, thereby enabling at least two of the N touch scan regions have different touch loads, wherein dividing the display touch panel into the N touch scan regions comprising:

dividing the display touch panel into the N touch scan regions by performing a random program.

19. The display touch scanning method according to claim 18, wherein obtaining the touch scanning sequence of the N touch scan regions comprising:

selecting one of a plurality of preset touch scanning sequences randomly.

20. The display touch scanning method according to claim 18, wherein obtaining the touch scanning sequence of the N touch scan regions comprising:

obtaining the touch scanning sequence by performing a random program.

* * * * *